United States Patent [19]

Hoogenboom et al.

[11] Patent Number: 5,625,502

[45] Date of Patent: Apr. 29, 1997

[54] MIRROR PIVOTING MECHANISM, AND VEHICLE COMPRISING SUCH MIRROR PIVOTING MECHANISM

[75] Inventors: Rudolf P. Hoogenboom, Montfoort; Stefan F. Brouwer, Den Haag; Adrianus J. M. Blom, Zeist; Martinus A. B. Vernooij, Houten, all of Netherlands

[73] Assignee: Eaton Corporation, Cleveland, Ohio

[21] Appl. No.: 481,296

[22] PCT Filed: Dec. 23, 1993

[86] PCT No.: PCT/NL93/00276

§ 371 Date: Jul. 26, 1995

§ 102(e) Date: Jul. 26, 1995

[87] PCT Pub. No.: WO94/14633

PCT Pub. Date: Jul. 7, 1994

[30] Foreign Application Priority Data

Dec. 24, 1992 [NL] Netherlands ............... 9202266

[51] Int. Cl.$^6$ ............... G02B 5/08; G02B 7/182; G02B 7/18

[52] U.S. Cl. ............... 359/872; 359/841; 359/873; 359/876; 359/877; 248/474; 248/479

[58] Field of Search ............... 359/872, 873, 359/874, 876, 877, 841; 248/474, 479, 485

[56] References Cited

U.S. PATENT DOCUMENTS

| 4,863,255 | 9/1989 | Seitz | 359/841 |
|---|---|---|---|
| 4,981,349 | 1/1991 | Tamiya et al. | 359/877 |
| 4,988,068 | 1/1991 | Yamana et al. | 359/841 |
| 5,245,480 | 9/1993 | Polzer | 359/841 |
| 5,467,222 | 11/1995 | Oishi | 359/841 |

FOREIGN PATENT DOCUMENTS

| 4023375A1 | 1/1992 | Germany. | |
|---|---|---|---|
| 32940 | 2/1989 | Japan | 359/841 |
| WO91/04172 | 4/1991 | WIPO. | |

Primary Examiner—Paul M. Dzierzynski
Assistant Examiner—Mohammad Y. Sikder
Attorney, Agent, or Firm—Roger A. Johnston

[57] ABSTRACT

A motor actuated foldable vehicle outside rearview mirror which can also be manually folded to and from the service position. A first friction coupling is provided between one of the motor actuated parts and the mirror carrier. A second friction coupling is provided to detent the service position. Stops are provided on the mirror carrier and base to limit forward and rearward folding. A third friction coupling is provided which is active in the service position to provide greater resistance to forward folding than to rearward folding. Stationary concentric contact strip are provided on the carrier and moveable wipers on the stationary strips provide switching for energizing the motor on the carrier for powering folding.

15 Claims, 7 Drawing Sheets

MIRROR PIVOTING MECHANISM, AND VEHICLE COMPRISING SUCH MIRROR PIVOTING MECHANISM

FIELD OF THE INVENTION

The invention relates to a mirror pivoting system for pivotally connecting a mirror housing of a rearview mirror relative to a vehicle, comprising: a first carrier member which is adapted to be fixedly connected relative to the vehicle; a second carrier member which is adapted to be connected to the pivotable mirror housing, and which is pivotally coupled with the first carrier member; a movement actuator comprising an electric motor and a transmission system associated therewith, which movement actuator has a first actuator part coupled with the first carrier member and a second actuator part coupled with the second carrier member and is designed to cause the second carrier member to perform a pivotal movement relative to the first carrier member; and a first clamping coupling which is arranged between one of the first and second actuator parts and the respective one of the first and second carrier members.

DESCRIPTION OF RELATED ART

Such a mirror pivoting mechanism is known in practice and is adapted to be mounted in the interior of a mirror housing/base combination of a rearview mirror to be attached to the side of a vehicle. In appearance, the mirror housing/base combination forms one whole, with the mirror base being attached to the vehicle and with the mirror housing, having the rearview mirror arranged therein, being pivotable relative to the mirror base. In the service position of the mirror housing, where the mirror surface makes an angle of nearly 90° with the side of the vehicle, a driver of the vehicle can view the part of the road beside and behind the vehicle through the mirror. The mirror housing projects relative to the side of the vehicle, and the pivotal movement referred to provides the possibility, if desired, to fold the mirror housing into a rearwardly folded position so as to remove such projection or at least to reduce it, so that the total width of the combination of the vehicle and the mirror housing is reduced, which provides advantages, for instance when parking in situations where only little parking space is available, or to prevent damage due to passing vehicles.

The pivotal movement can be carried out manually. When the vehicle is provided with a mirror pivoting mechanism as described above, which will generally be the case with luxury vehicles, the driver is given the possibility of folding the mirror housing rearwardly from his seat by operating the electric motor. The option of manual operation, however, is retained, so that it is also possible to manually move the mirror housing from the service position to the rearwardly folded position and vice-versa by exerting an external force on the mirror housing. On the one hand this offers the possibility of folding the mirror housing inwardly or outwardly in case of an electric failure as well, and, on the other hand, it provides a protection against the occurrence of damage because the mirror housing will yield rather than break off.

In a system as known, for instance, from Dutch patent application 89.02300, the above is realized in that the transmission system comprises a gear reduction system of which an input gear is mounted on the output shaft of the motor and of which an output shaft is coupled via a friction coupling with the first carrier member. The motor is fixedly connected with the second carrier member. Upon operation of the electric motor, the friction coupling keeps the output shaft of the gear reduction system fixed relative to the first carrier member, so that the motor, and hence the mirror housing, rotates about the output shaft fixed relative to the first carrier member. When an external couple is exerted on the mirror housing, the transmission system is blocked and the output shaft can be practically regarded as being fixedly connected with the mirror housing. When said external couple exceeds a predetermined value, the friction coupling will slip so as to allow the mirror housing to pivot.

Although this known system is satisfactory, there are still some disadvantages associated with it.

A first disadvantage concerns the fact that upon the exertion of an external couple on the mirror housing the parts of the blocking transmission system are loaded relatively heavily. Further, the inevitable play between said parts must be bridged before the transmission system can function as a blockade, which can be felt as play in the service position of the mirror housing. A disadvantage associated therewith concerns the fact that during driving air flows along the vehicle and unintentionally exerts a varying external force (couple) on the mirror housing. In conjuction with the above-mentioned play, this may lead to vibrations of the mirror housing.

Another disadvantage concerns the fact that when the mirror housing is pivoted through manual operation, the service position is not positively secured, and cannot even be felt as a "click" position, that, however, any position can be achieved in stepless manner. This means that the driver, after pivoting the mirror housing through manual operation, must readjust the mirror again. Only in the case of electrical operation of the known system does the mirror housing return to its original position.

Further, with the known system the external couple that is required to remove the mirror housing from its service position is equal to the external couple that is required to pivot the mirror housing further, the magnitude of the required couple being determined by the maximum value of the couple that the friction coupling can deliver without slipping.

SUMMARY OF THE INVENTION

The object of the invention is to provide a mirror pivoting mechanism which does not have these disadvantages.

In particular, the object of the invention is to provide a mirror pivoting mechanism in which, at least in the service position, the first carrier member and the second carrier member are free of play relative to each other. This prevents the mirror housing from vibrating or even being pivoted from the service position, already by an external force exerted unintentionally on the mirror housing, such as occurs, for instance, as a result of the air flowing along the vehicle during driving.

More particularly, the object of the invention is to provide a mirror pivoting mechanism where, in the service position, the first carrier member and the second carrier member are to a certain extent secured relative to each other, whilst the service position of the mirror housing, with regard to external adjustment, can be properly "felt" and reproduced. The expression "secured to a certain extent" means that an external force (couple) up to a predetermined threshold value does not lead to a change of the relative position of the first carrier member and the second carrier member; only when said threshold value is exceeded will the first carrier member and the second carrier member pivot relative to each other. Said threshold value, however, need not be accurately defined.

The above-mentioned objects imply that the external force (couple) which will be required to pivot the mirror housing from the service position is relatively large. More particularly, the object of the invention is to provide a mirror pivoting mechanism in which the above is realized in such a manner that such relatively large external force (couple) is not, at least not completely, transmitted to the transmission system, so that the parts of the transmission system are hardly loaded, if at all, while it is further desired that the couple to be exerted by the actuator to pivot the mirror housing from the service position to the rearwardly folded position and vice versa be relatively slight. The point is that the advantage is then achieved that said parts can be made relatively light and/or small and that they can even be manufactured from a synthetic material without being subject to undue wear. The use of synthetic material provides the advantage of a relatively low-noise operation of the mechanism. Further, the advantage is achieved that for the electric motor use can be made of a type of relatively low power, which type may accordingly be relatively inexpensive and have relatively small dimensions.

A further objective of the present invention is to provide a mirror pivoting mechanism in which the end positions (service position and rearwardly folded position) to be achieved through manual adjustment and electrical adjustment, respectively, are identical.

A yet further objective of the present invention is to provide a mirror pivoting mechanism which can be regarded as a standard instrument, which can be used in several vehicle types, and which can even be used in a left as well as in a right wing mirror. The pivoting angle between service position and rearwardly folded position depends on the type of vehicle for which the mirror pivoting mechanism is intended. Heretofore, known mirror pivoting mechanisms have been application-specific, i.e., a separate design of the mirror pivoting mechanism must be manufactured for every type of vehicle. In terms of manufacture and stock-keeping it is cheaper when only one type needs to be manufactured, which is suitable for every vehicle.

To realize the above-mentioned objectives, the system of the above-mentioned type is characterized, according to the invention, in that a second clamping coupling is provided, which is arranged to be active in a service position of the system so as to clamp said one of the first and second actuator parts or said respective one of the first and second carrier members relative to the other of the first and second carrier members; that end position stops fixedly connected relative to the first and second carrier members are provided for defining at least a rearwardly folded position; that a third clamping coupling active between the first and second carrier members is provided for defining the service position, the threshold value of the third clamping coupling in a pivoting direction from the service position to the rearwardly folded position being smaller than in an opposite pivoting direction; and that switching means included in an exciting circuit for the motor are provided, which are fixed relative to said respective one of the first and second carrier members, and switching operating means coupled with said one of the first and second actuator parts are provided for operating the switching means.

Preferably, the third clamping coupling exerts a clamping force substantially exclusively when the system is in the service position, in a pivoting direction towards the forwardly folded position. In a preferred embodiment, the third clamping coupling is provided by a projection path formed on one of the first and second carrier members and a projection, cooperating therewith, which is coupled with the other of the first and second carrier members. Preferably, the third clamping coupling exerts a clamping force substantially exclusively when the system is in the service position, in a pivoting direction towards the forwardly folded position. In a simple embodiment, this is realized in that the projection path comprises a first projection path section along which the projection moves between the service position and the rearwardly folded position without touching the first projection path section, a projection path stop section which forms a stop for the projection so as to define the service position, and a second projection path section along which the projection moves between the service position and the forwardly folded position; and that the projection is biased by a resilient member in the direction of the projection path, and must be moved against the spring force of that resilient member to get from the projection path stop section to the second projection path section.

The effect thus achieved is that in normal situations the service position can be located positively and reproducibly, both in the case of manual operation and in the case of electrical operation, without the motor having to deliver unnecessarily much power when it is desired to leave the service position.

The above-mentioned and other aspects, advantages and features of the invention will be further clarified hereinafter by the description of a preferred exemplary embodiment of the device according to the invention, with reference to the drawing. In the drawing:

BRIEF DESCRIPTION OF THE DRAWING

FIG. 8A shows a side view, comparable to FIG. 4, of a modified embodiment; and

FIG. 8B shows a section, comparable to FIG. 5, of this modified embodiment.

The following terms as used hereinafter are defined as follows:

DETAILED DESCRIPTION OF PREFERRED EMBODIMENT 1) threshold value of a clamping coupling: a clamping coupling between two parts keeps those parts together as long as the force (couple) exerted on those parts does not exceed a predetermined value, the threshold value; above that threshold value the clamping coupling loses its clamping action. An example of such a clamping coupling is a friction coupling, where the clamping action is obtained by friction.

2) slip value of a friction coupling: when the force (couple) exerted on those parts is greater than the threshold value, the friction coupling will slip. In the process, the friction coupling exerts a frictional force opposite to the direction of the slipping movement, the slip value, which is generally lower than the threshold value, but may also be equal thereto.

Figure 1A:
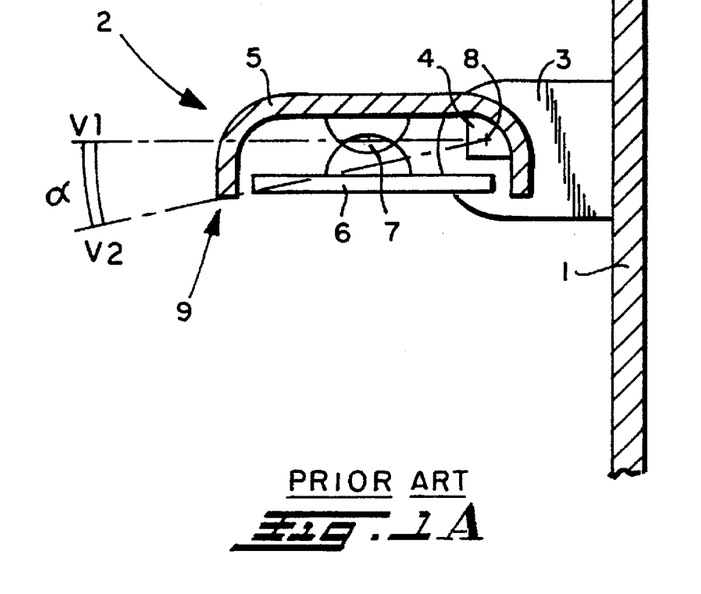
FIGS. 1A-B show a diagrammatic top plan view, partly in section, of a mirror housing connected to a vehicle to illustrate the rearward folding thereof.

FIG. 1A, by way of example, shows a diagrammatic top plan view of a left wing mirror system 2 connected to a vehicle 1. The system 2 comprises a mirror base 3, mounted on the vehicle 1, having attached thereto a first carrier member (not shown in this drawing for the sake of clarity), and a second carrier member 4 which is connected to a mirror housing 5. In the mirror housing 5 a mirror 6 is mounted for adjustment through adjusting means 7. Since the adjusting means 7 can be adjusting means that are known per se and the operation and construction thereof do not constitute a subject of the present invention, they will not be further discussed now.

The second carrier member 4 is coupled with the first carrier member so as to be pivotable about a pivotal axis 8, so that the mirror housing 5 can pivot about said axis 8 relative to the vehicle 1. FIG. 1A depicts the mirror housing 5 in its service position, where the mirror surface of the mirror 6 makes an angle of almost 90° with the solid axis of the vehicle 1, at any rate an angle such that a driver of the vehicle 1 can view the part of the road located beside and behind the vehicle 1 through the mirror 6. It will be clear that the precise value of said angle depends inter alia on the height of the driver and on the point of attachment of the mirror relative to the vehicle, and hence on the type of vehicle.

In FIG. 1A the service position of the mirror housing 5 is characterized by the angle α included between a plane V1 extending through the axis 8 perpendicular to the solid axis of the vehicle 1 and a plane V2 defined by the axis 8 and a selected point 9 on the mirror housing 5, which selected point 9, in the example illustrated in FIG. 1, is the extreme edge of the mirror housing 5.

Figure 1B:
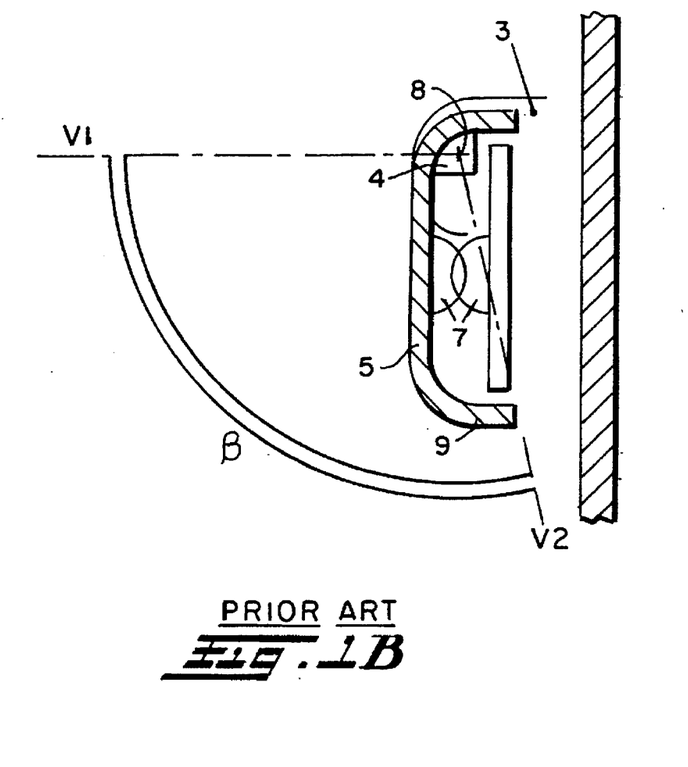

FIG. 1B depicts the mirror housing 5 in the rearwardly folded position, where the mirror surface of the mirror 6 is practically parallel to the solid axis of the vehicle 1. In FIG. 1B the rearwardly folded position of the mirror housing 5 is characterized by the angle β which is then included between said planes V1 and V2. The pivoting angle γ of the mirror housing 5 is presently defined as the angle through which the mirror housing 5 must be pivoted to get from the service position to the rearwardly folded position, and vice versa, which pivoting angle γ is accordingly given by γ=β−α.

Figure 7:
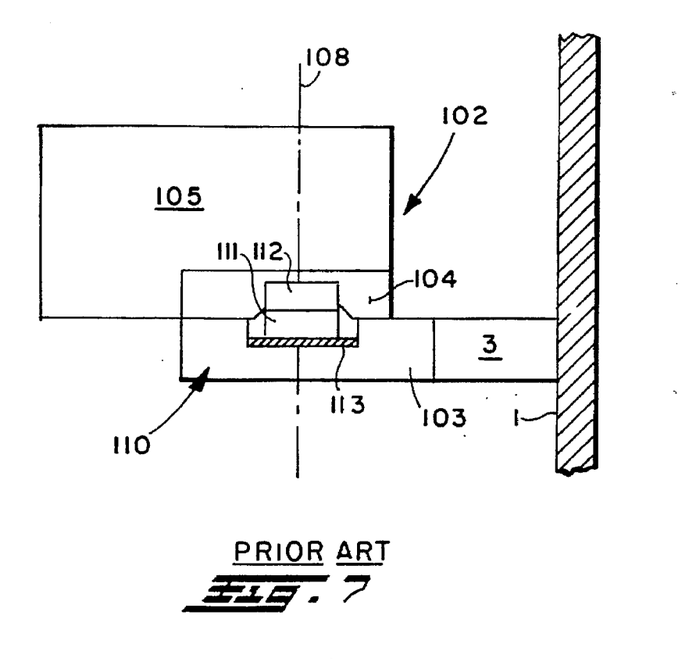
FIG. 7 shows a diagrammatic section, comparable to FIG. 2, of a known system.

FIG. 7 shows a diagrammatic front view of a wing mirror system 102 in the design as known from Dutch patent application 89.02300, to illustrate the principle of its operation. The system 102 comprises a first carrier member 103 which is adapted to be connected to the mirror base 3 of a vehicle 1, and a second carrier member 104 which is adapted to be connected to a mirror housing 105. The first carrier member 103 and the second carrier member 104 can pivot relative to each other about a pivotal axis 108. To that end, a movement actuator 110 is provided, which comprises a first actuator part 111 and a second actuator part 112. The first actuator part 111 and the second actuator part 112 form part of a planetary reduction system which is aligned with the pivotal axis 108; for a further discussion thereof, reference is made to said Dutch patent application 89.02300. Suffice it to note that such a planetary reduction system has the property that the first actuator part 111 and the second actuator part 112 will rotate relative to each other about said axis 108 when an input gear of the planetary reduction system is rotated by a motor not shown in FIG. 7. In the design shown in said Dutch patent application 89.02300, the motor is arranged within the mirror housing 105.

The second actuator part 112 is fixedly connected with the second carrier member 104, whilst the first actuator part 111 is coupled with the first carrier member 103 through a friction coupling 113. The operation of the known system is as follows:

Electrical operation:

The motor is driven so as to rotate the first actuator part 111 and the second actuator part 112 relative to each other. The friction coupling 113 retains the first actuator part 111 relative to the first carrier member 103. Accordingly, the second carrier member 104 will rotate relative to the first carrier member 103, and therefore the mirror housing 105 will pivot relative to the vehicle. The attainment of the rearwardly folded position or the service position is detected by microswitches coupled between the first carrier member 103 and the second carrier member 104, whereupon the motor is switched off and, accordingly, the pivotal movement is stopped.

Manual operation:

On the mirror housing 105 an external couple is exerted so as to pivot the mirror housing 105 relative to the vehicle, i.e. to rotate the second carrier member 104 relative to the first carrier member 103. The first actuator part 111 and the second actuator part 112 cannot rotate relative to each other because such rotation is counteracted by the planetary reduction system, so that the first actuator part 111 and the second actuator part 112 can be regarded as being rigidly coupled with the second carrier member 104. Pivoting of the combination of second carrier member 104, second actuator part 112 and first actuator part 111 relative to the first carrier member 103 is counteracted by the friction coupling 113. When the externally exerted couple is greater than the threshold value of the friction coupling 113, the mirror housing 105, together with the second carrier member 104, the second actuator part 112 and the first actuator part 111, will pivot relative to the first carrier member 103 and hence relative to the vehicle.

Figure 2:
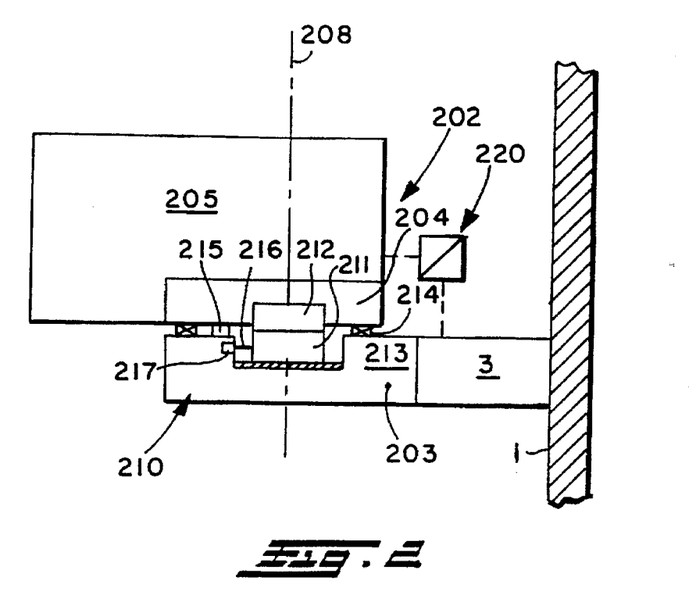
FIG. 2 shows a diagrammatic section of a mirror housing connected to a vehicle to illustrate the essence of the invention.

FIG. 2 diagrammatically shows the construction and the operation of a wing mirror system 202 according to the invention. The system 202 comprises a first carrier member 203 which is adapted to be connected to the mirror base 3 of a vehicle 1, and a second carrier member 204 which is adapted to be connected to a mirror housing 205. The first carrier member 203 and the second carrier member 204 can pivot relative to each other about a pivotal axis 208. The system 202 comprises in the second carrier member 204 a movement actuator 210 comprising a first actuator part 211 and a second actuator part 212. The two movement actuator parts 211 and 212 are adapted to rotate relative to each other about the axis 208 when they are driven by a motor, not shown for the sake of simplicity. Preferably, the two movement actuator parts 211 and 212 are formed by the two output sets of teeth of a planetary reduction system.

The second actuator part 212 is fixedly connected with the second carrier member 204 and may be formed integrally therewith. The first actuator part 211 is coupled with the first carrier member 203 through a friction coupling 213. The threshold value of the friction coupling 213 is preferably approximately 4 Nm.

Included between the first carrier member 203 and the second carrier member 204 is a friction coupling 214 whose threshold value is less than that of the friction coupling 213, and preferably equals approximately 2 Nm. In FIG. 2 the friction coupling 214 is depicted as being coupled directly between the first carrier member 203 and the second carrier member 204; it is also possible for the friction coupling 214 to be coupled between the first actuator part 211 and the second carrier member 204.

Included between the first carrier member 203 and the second carrier member 204 is a clamping coupling 215. The clamping coupling 215 has a working position in which it provides a force-transmitting coupling between the first carrier member 203 and the second carrier member 204, and a release position in which the carrier members 203 and 204 are not coupled to each other through the clamping coupling 215 and hence can, in principle, rotate freely relative to each other. An example of such a locking element is a ball or pawl pressed into a recess by means of spring force.

Preferably the clamping coupling 215 exerts its clamping action in one direction only.

Mounted on the first carrier member 203 are switching means 217 for the motor, not shown for the sake of clarity, which switching means 217 are operated by the first actuator part 211 by means of switching operating means 216.

Further provided are end position stops, which are designated by the reference numeral 220 in FIG. 2, which are arranged to mechanically define the extreme pivotal positions of the mirror housing 205. These end position stops 220 can have any suitable construction, as will be clear to a person of ordinary skill in the art. The end position stops 220 may for instance be formed as projections on the carrier members 203 and 204. The result thus achieved is that a vehicle manufacturer can fix the extreme pivotal positions of the mirror housing as he sees fit without having to consult with the manufacturer of the mirror pivoting mechanism and without the mirror pivoting mechanism having to be adapted thereto, whilst the advantage achieved for the manufacturer of the mirror pivoting mechanism is that he can manufacture his mirror pivoting mechanisms without taking account of vehicle-specific requirements with regard to the end positions.

The result thus achieved is that the mirror pivoting mechanism can be a standard instrument, permitting a vehicle-specific service position of the mirror housing 205 relative to the mirror base 3 to be selected and set by choosing the pivotal position in which the mirror pivoting mechanism is mounted on the mirror base 3 and the mirror housing 205.

It applies in particular, with reference to FIG. 1A–B, that angle $\beta$ is defined by the end position stops and that angle $\alpha$ is defined by the precise pivotal position in which the mirror pivoting mechanism is built into the mirror housing/base combination, so that the pivoting angle $\gamma$ can be variable without the necessity of modifications.

The operation of the device shown diagrammatically in FIG. 2 is as follows:

Manual operation:

On the mirror housing 205 an external couple is exerted to pivot the mirror housing 205 relative to the vehicle, i.e. to rotate the second carrier member 204 relative to the first carrier member 203. However, such rotation is counteracted by the combination of the first friction coupling 213, the second friction coupling 214, and the clamping coupling 215, which couples the first carrier member 203 and the second carrier member 204 with each other as long as the difference between the externally exerted force and the slip values of the first and second friction couplings 213 and 214 is less than the threshold value of the clamping coupling 215. The sum of those slip values and that threshold value has been chosen such that it is not exceeded by coincidental and/or unintentional loads, such as for instance passers-by. In a suitable design, the first friction coupling 213 has a slip value of 4 Nm and the second friction coupling 214 has a slip value of 2 Nm, whilst the threshold value of the clamping coupling 215 may then be 3 Nm.

When the externally exerted couple is precisely so large that the clamping coupling 215 loses its locking action, the assembly of the mirror housing 205, the second carrier member 204, the second actuator part 212 and the first actuator part 211 can rotate relative to the first carrier member 203. To that end, however, it is necessary to overcome the friction of the first friction couple 213 and, in the form illustrated in FIG. 2, that of the second friction couple 214. When the threshold force of the first friction coupling 213 has been selected to be 4 Nm, the threshold force of the second friction coupling 214 has been selected to be 2 Nm, and the threshold force of the clamping coupling 215 has been selected to be 3 Nm, it is therefore possible to externally force the mirror housing 205 to rotate only by exerting a couple of 9 Nm. Once the pivotal movement has been initiated, the clamping coupling 215 exerts substantially no frictional force anymore. The external couple that is then required to further rotate the mirror housing equals the sum of the threshold forces of the first friction coupling 213 and the second friction coupling 214, i.e. 6 Nm.

Thus, the maximum load the actuator system is subject to is the slip value of the first friction coupling 213, in this example 4 Nm. Further, the achieved locking of the second carrier member 204 relative to the first carrier member 203, i.e., of the mirror housing 205 relative to the vehicle, is substantially free of play.

The rearward pivoting movement is terminated when the end position stops 220 strike each other.

When the mirror housing 205 is to be pivoted back from the rearwardly folded position to the service position, it holds, in a comparable manner as described in the above, that the required couple equals 6 Nm, whilst the actuator system is loaded to a maximum of 4 Nm. When the service position is achieved, suddenly the clamping coupling 215 becomes active again, so that the couple required for further pivoting movement is increased by jumps, which can be clearly sensed.

Electrical operation:

The motor is driven to rotate the first actuator part 211 and the second actuator part 212 relative to each other. When this occurs in the direction in which a one-directionally active clamping coupling 215 is not active, the first carrier member 203 and the second carrier member 204 can rotate relative to each other. The only element that counteracts the rotation of the second carrier member 204 relative to the first carrier member 203 is the second friction coupling 214, whose threshold value, however, is less than that of the first friction coupling 213. The first actuator part 211 can now be considered to be rigidly connected with the first carrier member 203 through the first friction coupling 213, and the mirror housing 205 will therefore pivot relative to the vehicle.

The rearward pivoting movement is terminated when the end position stops 220 strike each other.

A further rotation of the second carrier member 204 relative to the first carrier member 203 is then no longer possible. However, the motor rotates further so that the first actuator part 211 is forced to rotate relative to the second actuator part 212 and relative to the first carrier member 203, with the friction coupling 213 slipping. This continues until the switching means 217 mounted on the first carrier member 203 are operated by the first actuator part 211 via switching operating means 216 to switch off the motor.

In this position the switching means 217 do allow the rotation of the motor in the opposite direction. Thus, if a command is given for the mirror housing 205 to pivot back into the service position again, then the motor rotates in the opposite direction. When the service position is achieved, suddenly the clamping coupling 215 becomes active again, so that the couple required for further pivoting motion is increased by bounds. When the threshold value of the clamping coupling 215 in that direction has been chosen to be greater than 2 Nm, the couple required for further pivoting motion is greater than 4 Nm, which cannot be transmitted by the motor since the slip value of the friction coupling 213 is only 4 Nm. However, the motor rotates further, so that the first actuator part 211 is forced to rotate relative to the second actuator part 212 and relative to the first carrier member 203, with the friction coupling 213 slipping. This continues until the switching means 217 mounted on the first carrier member 203 are operated by the first actuator part 211 via the switching operating means 216 to switch off the motor again.

What is accomplished with the construction according to the invention described in the foregoing is that the manually attainable end position (service position, rearwardly folded position) are identical to the end positions attainable through electrical operation.

It will be clear that an operation comparable to that described in the foregoing is obtained when the first actuator part 211 is rigidly connected with the first carrier member 203, with the friction coupling 213 being arranged between the second actuator part 211 and the second carrier member 204.

Figure 3:
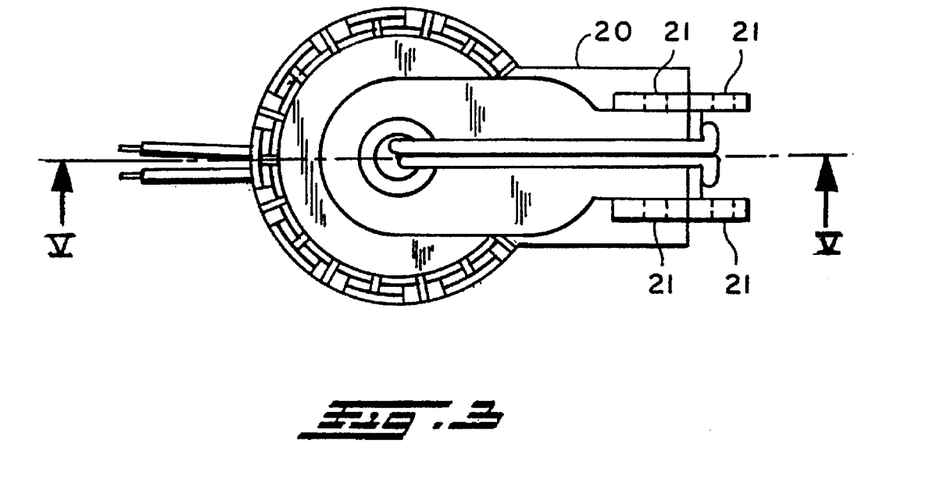
FIG. 3 shows a top plan view of an embodiment of the mirror pivoting mechanism according to the invention.

Now an embodiment of a mirror pivoting mechanism according to the invention will be discussed with reference to FIGS. 3–5.

Figure 5:
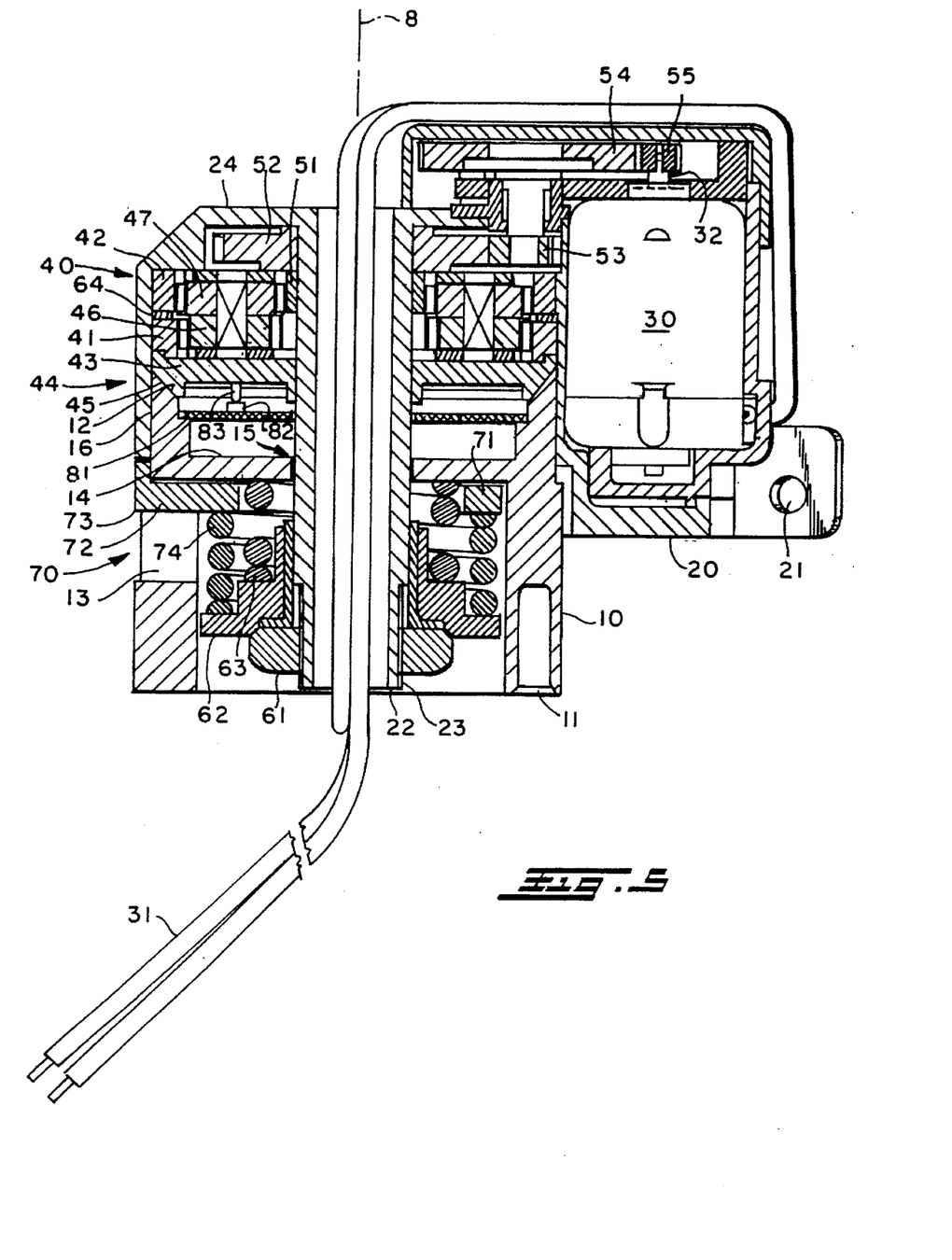
FIG. 5 shows a section taken on the line V—V of FIG. 3.
Figure 5A:
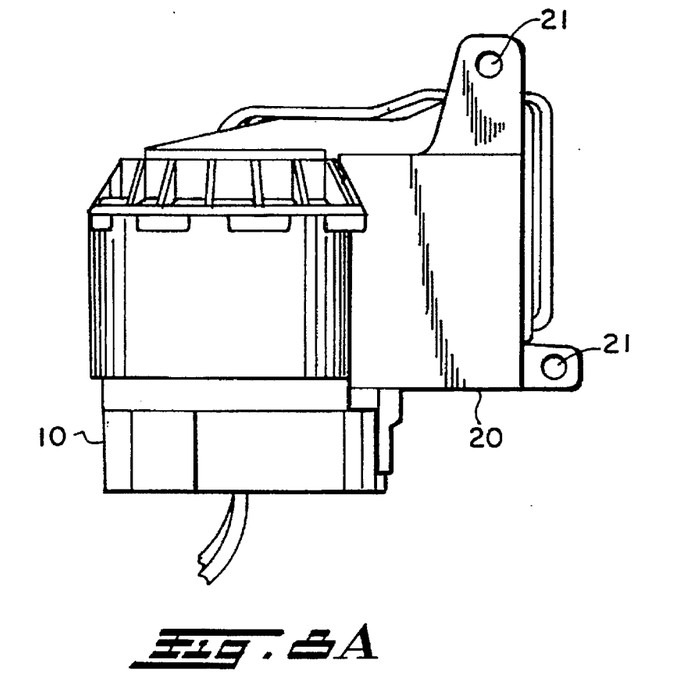
Figure 5B:
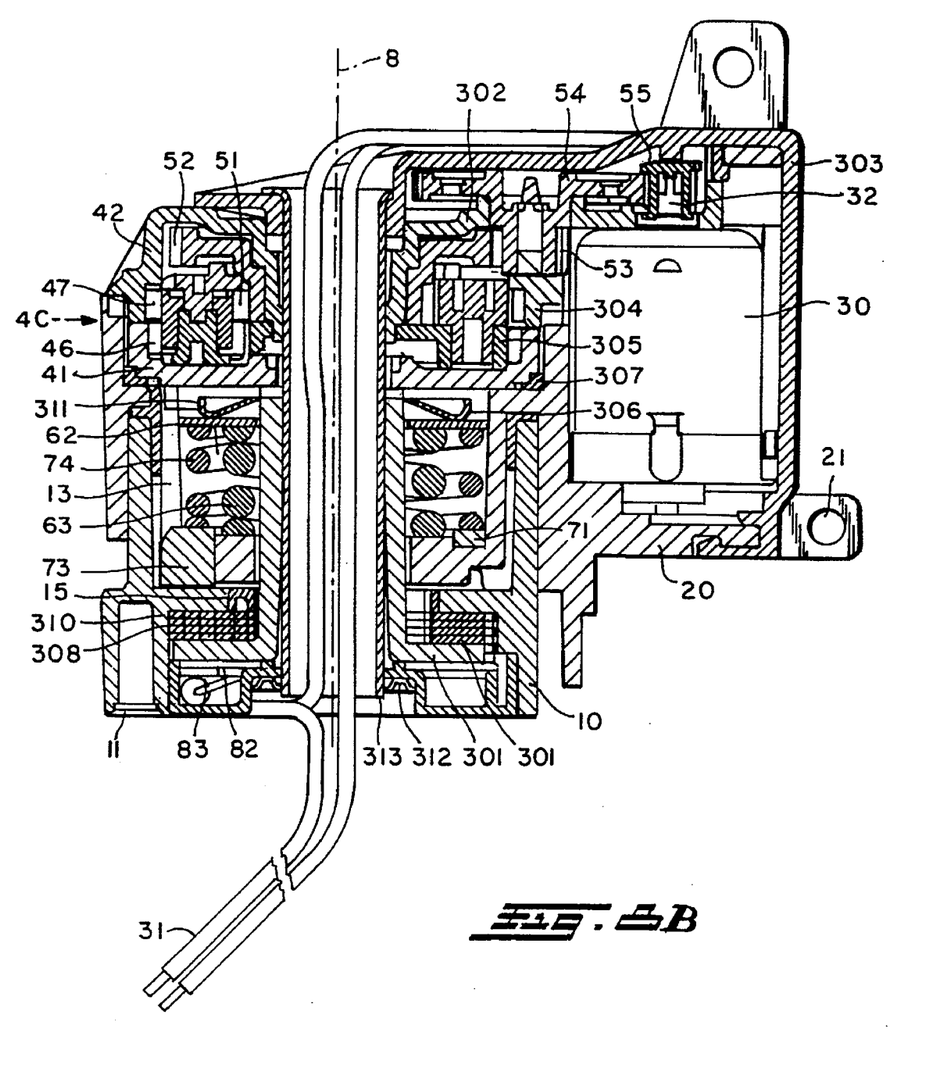

FIG. 5 shows a detailed section of a part of a practical embodiment of the mirror pivoting mechanism according to the present invention. Reference numeral 10 designates a first carrier member, which is adapted to be fixedly connected to a mirror base of a vehicle, not shown for simplicity's sake, for instance through screw holes 11. Further, reference numeral 20 designates a second carrier member, which is adapted to be fixedly connected to a mirror housing, not shown either for simplicity's sake, for instance through fixing holes 21. The second carrier members 10 and 20 can rotate relative to each other about an axis of rotation 8.

The first carrier member 10 generally has the shape of a hollow tube which is coaxial with the axis of rotation 8. Perpendicularly to the axis of rotation 8, the first carrier member 10 comprises a partition 14 with a central opening 15. The tube section above the partition 14 has a cylindrical external surface 16. The second carrier member 20 likewise comprises a tube section with an end wall 24 arranged at the upper end thereof and, at the location of the cylindrical external surface 16 of the first carrier member 10, a cylindrical internal surface corresponding therewith. Extending coaxially downwards from the end wall 24 is a central rod 22, which is provided at its lower end with an external thread 23, and which in this example is hollow for passing therethrough connecting wires 31 for a motor 30 which is arranged within and connected to the second carrier member 20, these connecting wires 31 being adapted to be connected with a switch arranged in the vehicle.

Further, the mirror pivoting mechanism comprises a movement actuator 40, which in this embodiment comprises a planetary reduction system with two output sets of teeth 41 and 42. The first set of teeth 41 is coupled with or forms part of a disc 43, which is coupled with the first carrier member 10 through a first friction coupling 44. The first friction coupling 44 is provided by a conical external surface 45 of the disc 43 and a matching conical internal surface 12 of the first carrier member 10, and in this example has an threshold value of 4 Nm. The operation of this friction coupling 44 is analogous to that of the first friction coupling 213 described in the foregoing.

The second set of teeth 42 can be a loose part which is mounted on the second carrier member 20, but is preferably formed as an integral part of the second carrier member 20, as shown in the drawing.

The planetary reduction system further comprises a plurality of planet gears 46, 47 each consisting of a lower gear 46 coaxially connected with an upper gear 47. Each lower gear 46 is in mesh with the first set of teeth 41, and each upper gear 47, whose number of teeth differs from the number of teeth of the lower gear 46, is in mesh with the second set of teeth 42 and is driven by an input gear 51.

The input gear 51 of the planetary reduction system is coupled with the motor 30 through transmission gears 52, 53, 54 and 55, which last is mounted on the output shaft 32 of the motor 30. More specifically, the input gear 51 is coaxially connected with the transmission gear 52, which is in mesh with the transmission gear 53. The transmission gear 53 is coaxially connected with the transmission gear 54, which is in mesh with the transmission gear 55.

The first carrier member 10 and the second carrier member 20 are kept together by the combination of a nut 61 screwed onto the thread 23, a stepped ring 62 and a first resilient member 63. The resilient member 63 on the one hand has its upper end bearing on the partition 14 of the first carrier member 10 and exerts an upwardly directed force thereon, and on the other hand has its lower end bearing on the stepped ring 62 and accordingly exerts a downwardly directed force on the rod 22 of the second carrier member 20 through the stepped ring 62 and the nut 61. This force can be adjusted by screwing the nut 61 to a greater or lesser extent onto the rod 22.

The first carrier member 10 and the second carrier member 20 rest against each other in axial direction via the disc 43 and an annular friction ring 64 interposed between the disc 43 and the second carrier member 20, this friction ring 64 providing a second friction coupling whose threshold value is preferably approximately equal to 2 Nm and whose operation is analogous to that of the friction coupling 214 described in the foregoing. It is noted that the threshold value of the first friction coupling 44 and the threshold value of the second friction coupling can be adjusted by adjusting the above-mentioned pressing force.

Included between the first carrier member 10 and the second carrier member 20 is a locking element 70. The locking element 70 comprises a ring 71 which is arranged within the first carrier member 10, under the partition 14, and which is provided with at least one radially outwardly extending protrusion 72 which extends through a window 13 in the outer wall of the first carrier member 10. Formed on the end of the protrusion 72 is an upwardly directed projection 73. The ring 71 has its underside resting against the upper end of a second resilient member 74, which has its lower end resting against the above-mentioned stepped ring 62, so that an upwardly directed force can be exerted on the ring 71. The projection 73 is thereby biased so as to be pressed against a projection path 75 formed on the lower edge of the cylindrical wall of the second carrier member 20.

The mirror pivoting mechanism can be operated in two ways:

I) manual operation

Figure 4:
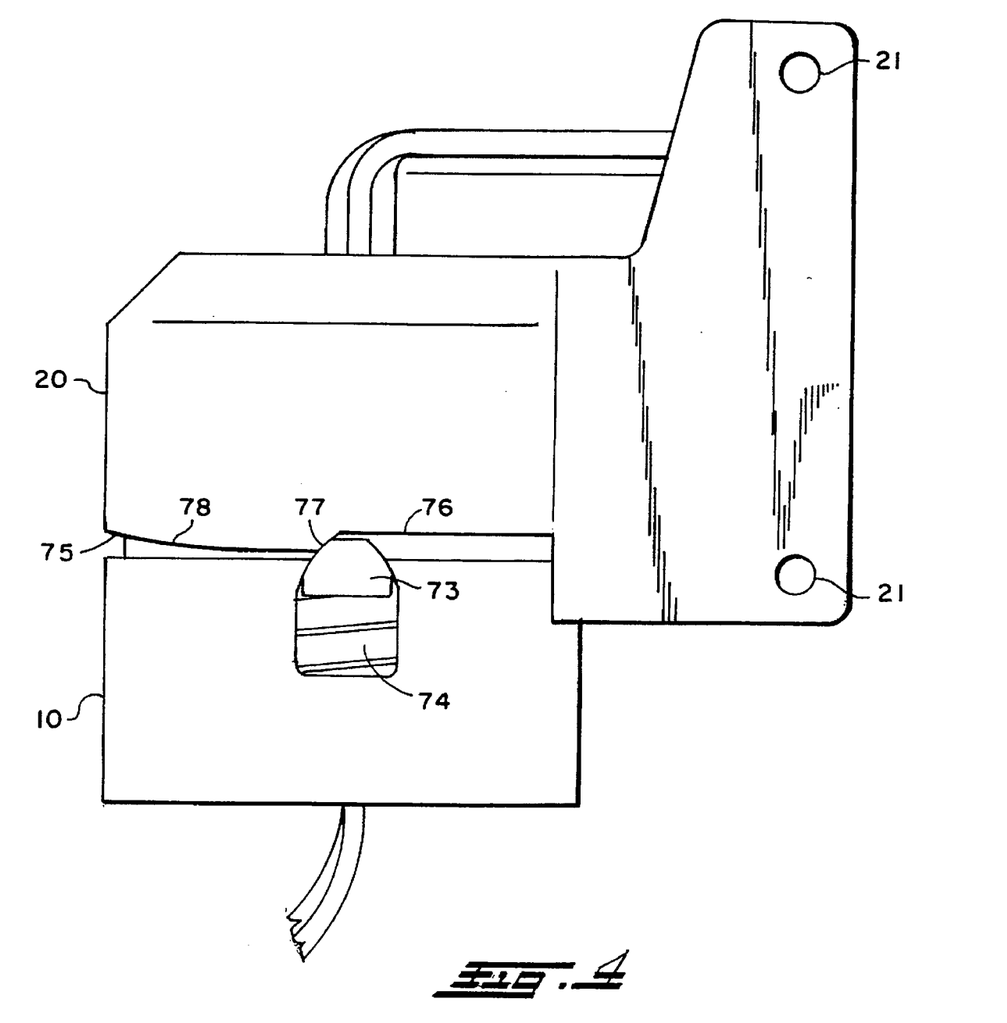
FIG. 4 shows a side view of the embodiment illustrated in FIG. 3.

FIG. 4 depicts the mirror pivoting mechanism in a position corresponding with the service position. It can be brought from the service position into the rearwardly folded position through manual operation by the exertion of an external force on the mirror housing, so that a couple is exerted on the second carrier member 20. Since the motor 30 is not rotated, it keeps the reduction coupling 40 still. The second carrier member 20 then forms a rigid whole with the planetary reduction system and the disc 43 relative to the first carrier member 10 with the projection 73. When the couple exerted is large enough, the second carrier member 20 rotates relative to the first carrier member 10, with the friction coupling 44 slipping.

The projection 73 now moves along the projection path 75, viz. along a first projection path section 76. In the illustrated example, this first projection path 76 is withdrawn so far that the ring 71 rests against the partition 14 of the first carrier member 10, so that the projection 73 in fact does not touch the first projection path section 76. As a consequence, the projection 73 is not subject to wear as the mechanism is being pivoted between the service position and the rearwardly folded position and vice versa.

As described in the foregoing, the rearwardly folded position is defined by end position stops which can be provided on the first and second carrier members 10, 20 and/or on the mirror housing and the mirror base. Such stops may have any suitable shape and will not be further described here. Suffice is to note that when the end position stops are provided on the mirror housing and the mirror base, the rearwardly folded position of the mirror housing relative to the mirror base is defined without modifications to the mirror pivoting mechanism being required. It may be desirable, however, to form end positions stops on the first and second carrier members 10, 20 as well, which serve only as a protection to prevent the possibility of the mirror housing striking the vehicle if the end position stops provided on the mirror housing and the mirror base should get out of order, and which are therefore normally inactive, unless the mirror pivoting mechanism is used in a vehicle whose mirror housing and mirror base are not provided with end position stops.

The pivoting motion of the mirror housing relative to the mirror base ends when the end position stops strike each other, or, of course, when the externally exerted couple is discontinued.

Returning the mirror housing from the rearwardly folded position to the service position can be affected manually as well by exerting an external force on the mirror housing in a direction opposite to the direction referred to in the foregoing. It does not matter here whether the rearwardly folded position has been achieved through manually or electrically operated pivotal movement. This is an important advantage of the construction according to the invention.

The projection 73 then moves along the first projection path 76 in opposite direction. The pivotal motion of the mirror housing relative to the mirror base ends when the projection 73 comes into contact with a projection stop section 77 of the projection path 75. Any further pivotal motion of the mirror housing relative to the mirror base is now counteracted and is possible only when the projection 73 is depressed against the force of the resilient element 74. The force (couple) required for such depression is dependent, on the one hand, on the magnitude of the force exerted by the resilient element 74 and, on the other hand, on the precise configuration of the projection 73 and the projection stop section 77.

The projection 73 striking against the projection stop section 77 is experienced by a user as a stop which can be felt quite clearly and the service position thus defined is achieved with certainty and reproducibly, which are important advantages of the invention.

Accordingly, in the example mentioned, the user should exert a couple of 4 Nm in order to fold the mirror housing rearwardly. In this process, however, the planetary reduction system is not subject to any load exceeding approx. 2 Nm, since the second friction coupling 64 is arranged in series with the first friction coupling 44 and parallel to the planetary reduction system, so that of the slip value of the first friction coupling 44, which is 4 Nm in the example mentioned, a couple maximally equalling the threshold value of the second friction coupling 64, which is 2 Nm in the example mentioned, is diverted past the planetary reduction system.

It is noted that the service position as thus defined has only a very slight play. This can be seen as follows. In the service position, the first carrier member 10 is coupled to the second carrier member 20 through the friction couplings 44 and 64, without intervention of the planetary reduction system. When an external couple of a value less than the threshold value of the second friction coupling 64 is (intentionally or unintentionally) exerted on the mirror housing, this external couple is completely taken up by the friction couplings 44 and 64. In that case the planetary reduction system is not loaded at all and any play of the planetary reduction system will not be sensible, while moreover such play, if any, in the case of external forces resulting from wind during driving and/or motion of the vehicle will not cause any vibrations of the mirror housing. This is an important advantage of the invention.

In the illustrated embodiment, the clamping coupling 70 does not exert any clamping action upon departure from the service position in the direction of the rearwardly folded position, because the first projection path section 76 is withdrawn so far that the projection 73 remains clear thereof. If desired, the first projection path section 76 can be shaped such that the projection 73 must be depressed a little to get into the first projection path section 76, so that the clamping coupling 70 exerts little clamping action in that case as well. What is achieved as a result is that the manual initiation of the folding pivoting movement requires more force without the manual continuation of the folding pivoting movement requiring more force and without the planetary reduction system being loaded more. In that case, however, a consequence is that the planetary reduction system must also deliver such increased force when the pivoting movement is operated electrically.

In the illustrated embodiment it is also possible to fold the mirror housing forwardly, i.e., to pivot the mirror housing from the service position in a direction opposite to the direction of rearward folding. For that purpose, an external force is required whose magnitude is large enough to first remove the locking action of the projection 73 against the projection stop section 77 by pressing the projection 73 inwards, which required force is greater than the force required to fold the mirror housing rearwardly. Once this has taken place, the projection 73 moves along a second projection path section 78, with the projection 73 being in contact with this second projection path section 78. It is true that the contribution to the slip couple caused by this is slight, yet this causes a friction load on the projection 73 as a consequence of which the projection 73 might be subject to wear. In practice, however, this is not an objection since in practice this forward folding movement (like the return movement) will hardly ever be carried out, if at all. In fact, this motional option only serves to enable the mirror housing to yield to a force exerted in the relevant direction, rather than break down, for instance as a result of a passer-by walking into the mirror housing or when the mirror housing is caught on an obstacle during reverse parking.

It holds for this forward folding movement, too, that the planetary reduction system is subject to a maximum load of only 2 Nm.

The forward folding movement ends when the end stops contact each other in a manner similarly to that described in the foregoing with respect to the rearward folding movement.

The mirror mechanism can be manually pivoted back from the forwardly folded position to the service position by exerting en external force in the proper direction. It holds for the illustrated embodiment that, since the second projection path section 78 slightly recedes from the projection stop section 77, the projection 73 must be depressed further and further, so that more and more external force must be exerted.

When the projection 73 reaches the projection stop section 77, the projection 73 suddenly jumps to the first projection path section 76, the potential energy stored in the spring 74 being thereby released. On account of the matching slopes of the projection 73 and the projection stop section 77, the projection 73 is given a "push" in the direction of the first projection path section 76 in the process, the force exerted by the user being reduced with a jump. When the projection 73 reaches the first projection path section 76, the projection stop section 77 no longer exerts any coactive force on the projection 73, so that the force exerted by the user is increased with a jump again. This is experienced by the user as a "click" signifying that the service position has been achieved.

II] operation of the actuator

It is also possible to go from the service position illustrated in FIG. 4 to the forwardly folded position through electrical operation. Through operation of a switch (not shown) the motor 30 is set into operation, which, through the transmission gears 52, 53, 54, 55 and the planetary reduction system, rotates the sets of teeth 41 and 42 relative to each other. The couple required for this is equal to the slip value of the second friction coupling 64 between the sets of teeth 41 and 42, being 2 Nm in the illustrated example.

As described in the foregoing, the second set of teeth 42 is rigidly connected with the second carrier member 20, whilst the first set of teeth 41 is rigidly connected with the disc 43, which in turn is coupled with the first carrier member 10 through the first friction coupling 44. The first friction coupling 44 does not slip and the first set of teeth 41, the disc 43 and the first carrier member 10 can be regarded as one rigid whole. Accordingly, through the rotation of the motor 30, the second carrier member 20 (with the mirror housing attached thereto) is pivoted relative to the first carrier member 10 (and the mirror base attached thereto) towards the rearwardly folded position, with the projection 73 moving along the first projection path section 76.

It will be clear that the operation of the motor 30 can take place by keeping the above-mentioned switch closed manually. In that case, by opening that switch before the rearwardly folded position has been achieved, any position between the service position and the folded position can be achieved utilizing the motor 30. It is preferred, however, to provide a switching circuit controlled by this switch in order to keep the motor excited, such as a relay or an electronic equivalent thereof, as will be clear to a person of ordinary skill, so that the motor 30 continues to rotate after the switch has been operated a single time.

The folding pivoting movement of the mirror housing relative to the mirror base ends when the end position stops strike each other, in a manner comparable to that described in the foregoing with respect to the manual operation. Now, however, the motor 30 rotates further, the sets of teeth 41 and 42 being further rotated relative to each other, without the carrier members 10 and 20 being able to rotate relative to each other. Any play between the sets of teeth 41 and 42 is thereby removed. In this connection, the second set of teeth 42, the second carrier member 20 and the first carrier member 10 can be regarded as one rigid whole, relative to which the first set of teeth 42 and the disc 43 rotate. In the process, both the first friction coupling 44 and the second friction coupling 64 slip, so that the required couple in the illustrated embodiment equals 6 Nm.

As shown in FIG. 5, the first carrier member 10, in the vicinity of the disc 43, has an electrically insulating plate 81 attached to it, comprising sliding tracks 82 for sliding contacts or sliding brushes 83 mounted on the disc 43. The power supply to the motor 30 occurs via these sliding tracks 82 and sliding contacts 83, and the precise electrical coupling between connecting wires 31, sliding tracks 82, sliding contacts 83 and motor 30 can be any suitable coupling, as will be clear to a person of ordinary skill, and accordingly is not illustrated in detail for simplicity's sake.

Figure 6:
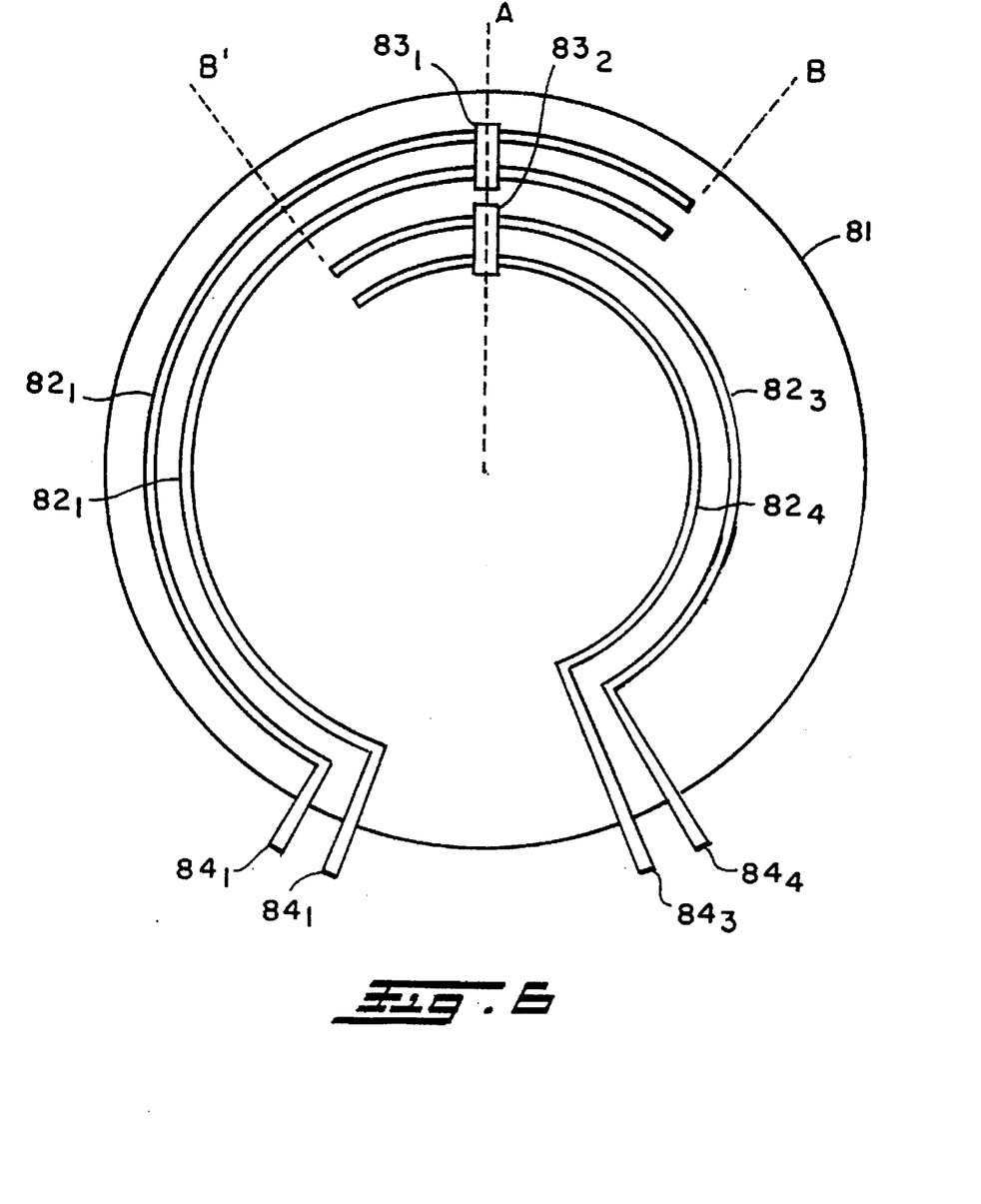
FIG. 6 diagrammatically shows a detail of the embodiment illustrated in FIG. 5.

It is noted that for clarity's sake FIG. 5 depicts only one sliding track 82 and a corresponding sliding contact 83, not drawn to scale. A diagrammatic embodiment of the sliding tracks 82 is shown in FIG. 6. Located on the electrically insulating plate 81, which is rigidly mounted on the first carrier member 10, are four mutually concentric annular sliding tracks $82_1$, $82_2$, $82_3$, $82_4$, respectively provided with connecting contacts $84_1$, $84_2$, $84_3$, $84_4$. The sliding tracks $82_1$ and $82_2$ extend clockwise from the respective connecting contacts $84_1$ and $84_2$ as far as a position indicated at B, and the sliding tracks $82_3$ and $82_4$ extend counterclockwise from the respective connecting contacts $84_3$ and $84_4$ as far as a position indicated at B'. In this embodiment, the sliding contacts $83_1$ and $83_2$ connected to the disc 43 are positioned radially relative to each other and respectively connect sliding tracks $82_1$, $82_2$ and the sliding tracks $82_3$, $82_4$.

The sliding tracks $82_1$ and $82_2$, the connecting contacts $84_1$ and $84_2$, and the sliding contact $83_1$ are intended to be included in an exciting circuit to cause the motor 30 to rotate in a direction corresponding with the clockwise direction of rotation of the sliding contact $83_1$ relative to the sliding tracks $82_1$ and $82_2$ in FIG. 6. Hereinafter it will be assumed that this direction of rotation corresponds with the pivoting motion of the mirror pivoting mechanism from the service position to the rearwardly folded position. The sliding tracks $82_3$ and $82_4$, the connecting contacts $84_3$ and $84_4$, and the sliding contact $83_2$ are intended to be included in an exciting circuit to cause the motor 30 to rotate in the opposite direction.

Suppose that the mirror pivoting mechanism is in the service position and that the sliding contacts $83_1$ and $83_2$ are located in an arbitrary position designated by A within the range defined by B and B'. In this position A the sliding contacts $83_1$ and $83_2$ are in contact with the respective sliding tracks $82_1$, $82_2$ and $82_3$, $82_4$, so that in the service position of the mirror pivoting mechanism the motor 30 can be excited in either direction of rotation.

As described in the foregoing, during the pivotal movement from the service position to the rearwardly folded position, the disc 43 is fixed relative to the first carrier member 10, so that the sliding contacts $83_1$ and $83_2$ continue to be located in position A. After the rearwardly folded position defined by the end position stops has been achieved, the motor 30 rotates further, so that the disc 43 rotates relative to the first carrier member 10, with the sliding contacts $83_1$ and $83_2$ moving clockwise relative to the respective sliding tracks $82_1$, $82_2$ and $82_3$, $82_4$ from position A. When the sliding contacts $83_1$ and $83_2$ reach position B, the sliding contact $83_1$ loses contact with the sliding tracks $82_1$ and $82_2$, so that the excitation of the motor 30 is stopped.

The electrically operated rearward folding operation is then at an end. When the switch in the vehicle intended for the forward folding movement is operated again, this has no consequences since the exciting circuit for the motor 30 is interrupted in that direction.

On the other hand, it is possible to pivot the mirror pivoting mechanism back from the rearwardly folded position to the service position through electrical operation because in that direction the exciting circuit for the motor 30 is not interrupted: in position B the sliding contact $83_2$ is still in contact with the sliding tracks $82_3$ and $82_4$. During the electrically operated reverse pivoting movement from the folded position to the service position, it applies, in a manner comparable to that described in the foregoing with respect to the electrically operated pivotal movement from the service position to the folded position, that the sliding contacts $83_1$ and $83_2$ remain fixed relative to the respective sliding tracks $82_1$, $82_2$ and $83_3$, $82_4$, so that the sliding contacts $83_1$ and $83_2$ continue to be located in position B. The projection 73 moves along the first projection path section 76 until the service position is reached and the projection 73 strikes the projection stop section 77.

As described in the foregoing, a further pivoting movement of the second carrier member 20 relative to the first carrier member 10 requires a couple which is sufficient to depress projection 73. This couple can not be delivered because already at a smaller couple the disc 43 will rotate relative to the first and second carrier members 10 and 20, again to be considered as rigid, with the first and second friction coupling 44 and 64 slipping. The motor 30 rotates further, whereby the sliding contacts $83_1$ and $83_2$ move counterclockwise from position B relative to the respective sliding tracks $82_1$, $82_2$ and $82_3$, $82_4$ from position B to position B'. When the sliding contacts $83_1$ and $83_2$ reach position B', the sliding contact $83_2$ loses contact with the sliding tracks $82_3$ and $82_4$, so that the excitation of the motor 30 is stopped.

The electrically operated reverse folding operation is then at an end. When the switch in the vehicle intended for the reverse folding operation is operated again, this has no consequences, since the exciting circuit for the motor 30 is interrupted in that direction.

It is noted that when the mirror pivoting mechanism has been brought into the rearwardly folded position through manual operation and the switch in the vehicle intended for the rearward folding operation is operated again, this only has as a consequence that the sliding contacts $83_1$ and $83_2$ move to position B, whereupon the motor 30 is switched off again in the manner described in the foregoing. It likewise applies that when the mirror pivoting mechanism has been brought into the service position through manual operation and the switch in the vehicle intended for the reverse folding operation is again operated, this only has as a consequence that the sliding contacts $83_1$ and $83_2$ move to position B', whereupon the motor 30 is switched off again in the manner described in the foregoing.

It is also possible for the mirror pivoting mechanism to be pivoted back through electrical operation from the rearwardly folded position to the service position when the mirror pivoting mechanism has been brought into the rearwardly folded position through manual operation, with the sliding contacts $83_1$ and $83_2$ being in position B': first the switch in the vehicle intended for the rearward folding operation is operated, which has as a consequence that the sliding contacts $83_1$ and $83_2$ move to position B; then the switch in the vehicle intended for the reverse folding operation is operated, whereupon the reverse pivoting operation is performed as described in the foregoing. Similarly, it is also possible to pivot the mirror pivoting mechanism through electrical operation from the service position to the rearwardly folded position when the mirror pivoting mechanism has been brought into the service position through manual operation, with the sliding contacts $83_1$ and $83_2$ located in position B, by first operating the switch in the vehicle intended for the reverse folding operation and then operating the switch in the vehicle intended for the rearward folding operation.

When the mirror pivoting mechanism, whether intentionally or not, has been brough into the forwardly folded position through manual operation, it can be brought back into the service position in a simple manner in two or three steps through electrical operation. The required number of steps depends on the position of the sliding contacts $83_1$ and $83_2$.

In the most unfavorable situation these are located in position B. When, in that case, in a first step the switch in the vehicle intended for the reverse folding operation is operated, there is not any change in the pivoted position of the mirror pivoting mechanism, but the disc 43 is rotated so as to bring the sliding contacts $83_1$ and $83_2$ to position $B^1$. When, from the beginning, the sliding contacts $83_1$ and $83_2$ are already located in position $B^1$, this first step can naturally be skipped.

In a second step the switch in the vehicle intended for the rearward folding operation is operated, whereupon the mirror pivoting mechanism is pivoted through the service position to the rearwardly folded position, and the sliding contacts $83_1$ and $83_2$ are brought to position B.

In a third step the switch in the vehicle intended for the reverse folding operation is operated, whereupon the mirror pivoting mechanism is pivoted to the service position and the sliding contacts $83_1$ and $83_2$ are brought to position $B^1$.

The above operation requires the driver to operate switches two or three times. In a luxury design, a control unit may be provided which is coupled, on the one hand, with the switches, and, on the other hand, with the connecting contacts $84_1$, $84_2$, $84_3$ and $84_4$, and to the motor 30, this control unit being adapted for carrying out the steps discussed in the foregoing after one of the switches has been operated in a single time, as will be clear to a person skilled in the art.

The embodiment now discussed is particularly reliable, in particular as regards possible electrical failures. Even if an electrical failure occurs after the mirror housing has been pivoted from the service position to the rearwardly folded position through electrical operation, or during electrical pivoting, so that the pivoting movement remains incomplete, the mirror housing can be pivoted back again manually.

It is further noted that the magnitude of the angular distance between positions B and B' as depicted in FIG. 6 is exaggerated. It is sufficient if a small value is selected for that angular distance, such as for instance 5°.

A modification of the embodiment shown in FIG. 5 is shown in FIGS. 8A and 8B, in which figures, for simplicity's sake, the same reference numerals have been used for the same or comparable parts. In the modified embodiment of FIG. 8, the first friction coupling is designed as a friction plate packet 310 with friction plates 308 and 309 between the first set of teeth 41 and the first carrier member 10, because such an embodiment is better controllable. In the embodiment shown, the friction plate packet 310 is arranged at the lower end of the device, and is coupled to the first set of teeth 41 with interposition of a T-shaped hollow tube 301.

Further, the second friction coupling 306 is arranged directly between the carrier member 10 and the second carrier member 20, so that an additional advantage is realized in that the slip value thereof need not be overcome during electrical adjustment. Provided between the first set of teeth 41 and the second carrier member 20 is a bearing ring 307.

For a better displacement of the switching means 82, 83, during assembly, they have been moved to the lower end of the instrument.

The central pin 313 is designed as a separate element, so that the housing parts can be manufactured in simpler and hence cheaper manner. The pressure plate 62 rests on the T-shaped hollow tube 301 by means of a fixing diaphragm ring 311 and at the lower end the device is closed by means of a fixing ring 312. Thus, the advantage of a simpler and cheaper manufacture is realized, while moreover securing means can be dispensed with, which is desired for a construction with a nut so as to prevent loosening through vibrations.

To obtain an improved seal against the penetration of dust and dirt, the projection 73 and the projection path have been moved to the inside of the instrument. Further, the projection path is incorporated into the first carrier member 10 instead of the second carrier member 20.

For the sake of simplified manufacture and assembly, the second carrier member 20 comprises a frame part 302 and a cover housing part 303 which is mounted on the second carrier member 20 and the frame part 302, respectively, by means of click connections. The cover housing part 303 is made from a synthetic material and the vertical side wall section thereof is pivotally connected to the upper part thereof through a pivot formed integrally thereon.

Further provided is a support 304 and a planet support 305 so as to fix the position of the planet gears 46, 47 relative to each other.

It will be clear to a person of ordinary skill in the art that it is possible to further change or modify the embodiments of the device according to the invention as depicted without departing from the inventive concept or the scope of the invention. Thus, for instance, the power supply to the motor, instead of being effected through the sliding tracks and sliding brushes discussed in the foregoing, can also occur through microswitches which are mounted at fixed positions relative to the first carrier member 10 and which are operated by one or more operating catches formed on the disc 43.

To keep the carrier members clamped together, a different construction can be used as well.

Further, it will be understood that other suitable threshold and slip values can be selected for the friction coupling.

We claim:

1. A mirror pivoting system for pivotally connecting a mirror housing (205) of a rearview mirror relative to a vehicle (1), comprising:

a first carrier member (203; 10) which is adapted to be fixedly connected relative to the vehicle;

a second carrier member (204; 20) which is adapted to be connected to the pivotable mirror housing (205), and which is pivotally coupled with the first carrier member (203; 10);

a movement actuator comprising an electric motor (30) and a transmission system (40) associated therewith, wherein the movement actuator has a first actuator part (211; 41) coupled with the first carrier member (203; 10) and a second actuator part (212; 42) coupled with the second carrier member (204; 20) and is designed to cause the second carrier member (204; 20) to perform a pivotal movement relative to the first carrier member (203; 10); and a first clamping coupling (213; 44) which is arranged between one of the first and second actuator parts (211; 41), (212; 42) and the respective one of the first and second carrier members (203; 10);

characterized in that:

a second clamping coupling (214; 64) is provided, which is arranged to be active in a service position of the system so as to clamp said one of the first and second actuator parts (211; 41) (212; 42) or said respective one of the first and second carrier members (203; 10) relative to the other of the first and second carrier members (204; 20);

that end position stops (220) fixedly connected relative to the first and second carrier members (203, 204; 10, 20) are provided for defining at least a rearwardly folded position;

that a third clamping coupling (215; 70) active between the first and second carrier members (203, 204; 10, 20) is provided for defining the service position, the threshold value of said third clamping coupling (215; 70) in a pivoting direction from the service position to the rearwardly folded position being smaller than in an opposite pivoting direction; and that switching means (217; 82) included in an exciting circuit for the motor (30) are provided, which are fixed relative to said respective one of the first and second carrier members (203; 10), and switching operating means (216; 83) coupled with said one of the first and second actuator parts are provided (211; 41) for operating the switching means (217; 82).

2. A system according to claim 1, characterized in that the second actuator part (212; 42) is fixed relative to the second carrier member (204; 20), that the first clamping coupling (213; 44) is arranged between the first actuator part (211; 41) and the second carrier member (203; 10), and that the second clamping coupling (214; 64) is arranged between the first actuator part (211; 41) and the second carrier member (204; 20) or the second actuator part (212; 42) fixed thereto.

3. A system according to claim 2, characterized in that further end position stops (220) fixedly connected relative to the first and second carrier members (203, 204; 10, 20) are provided for defining a forwardly folded position.

4. A system according to claim 1, characterized in that the third clamping coupling (215; 70) exerts a clamping force substantially exclusively when the system is in the service position, in a pivoting direction towards the forwardly folded position.

5. A system according to claim 1, characterized in that the third clamping coupling (215; 70) is provided by a projection path (75) formed on one of the first and second carrier members (20) and a projection (73) coacting therewith, which is coupled with the other of the first and second carrier members (10).

6. A system according to claim 5, characterized in that the projection path (75) comprises a first projection path section (76), along which the projection (73) moves between the service position and the rearwardly folded position without touching the first projection path section (76), a projection path stop section (77) forming a stop for the projection (73)

so as to define the service position, and a second projection path section (78) along which the projection (73) moves between the service position and the forwardly folded position; and that the projection (73) is biased in the direction of the projection path (75) by a resilient member (74) and must be moved against the spring force of said resilient member (74) to go from the projection path stop section (77) to the second projection path section (78).

7. A system according to claim 1 claims, characterized in that the switching means (217; 82) comprise sliding tracks ($82_1$, $82_2$, $82_3$, $82_4$) fixed relative to said respective one of the first and second carrier members (203; 10) and that the switching operating means (216; 83) comprise sliding contacts ($83_1$, $83_2$) fixed relative to said one of the first and second actuator parts (211; 41).

8. A system according to claim 7, characterized in that the sliding tracks ($82_1$, $82_2$, $82_3$, $82_4$) and sliding contacts ($83_1$, $83_2$) comprise a first set of sliding tracks ($82_1$, $82_2$) and associated sliding contact ($83_1$), which is designed to break the contact when said one of the first and second actuator parts (211; 41) is rotated relative to said respective one of the first and second carrier members (203; 10) in a direction corresponding with the pivoting direction from the service position to the rearwardly folded position, and a second set of sliding tracks ($82_3$, $82_4$) and associated sliding contact ($83_2$), which is designed to break the contact when said one of the first and second actuator parts (211; 41) is rotated in the opposite direction.

9. A system according to claim 1 claims, characterized in that the first clamping coupling (44) is formed by meshing, conical parts (43, 12) of respectively said one of the first and second actuator parts (41) and said respective one of the first and second carrier members (10).

10. A system according to claim 1 claims, characterized in that the first clamping coupling (213; 44) has a threshold value which is greater than that of the second clamping coupling (214; 64).

11. A system according to claim 10, characterized in that the first clamping coupling (213; 44) has a threshold value of approximately 4 Nm, and that the second clamping coupling (214; 64) has a threshold value of approximately 2 Nm.

12. A system according to claim 1 claims, characterized in that the mirror pivoting mechanism is mounted on the mirror base (3) and the mirror housing (205) so as to be adjustable in rotational direction.

13. A vehicle (1) with at least one rearview mirror mounted in a mirror housing (205) which is mounted on the vehicle by means of a system (202) according to any one of the preceding claims.

14. A vehicle according to claim 13, characterized in that the end position stops (220) are formed on the mirror housing (205) and the mirror base (3).

15. A system according to claim 1, characterized in that further end position stops (220) fixedly connected relative to the first and second carrier members (203, 204, 10, 20) are provided for defining a forwardly folded position.

* * * * *